S. T. DURANT & G. GUNDERSON.
W. C. HOWIE, ADMINISTRATOR OF S. T. DURANT, DEC'D.
SAGE BRUSH GRUBBING MACHINE.
APPLICATION FILED NOV. 6, 1909.
978,118.
Patented Dec. 6, 1910.
2 SHEETS—SHEET 1.
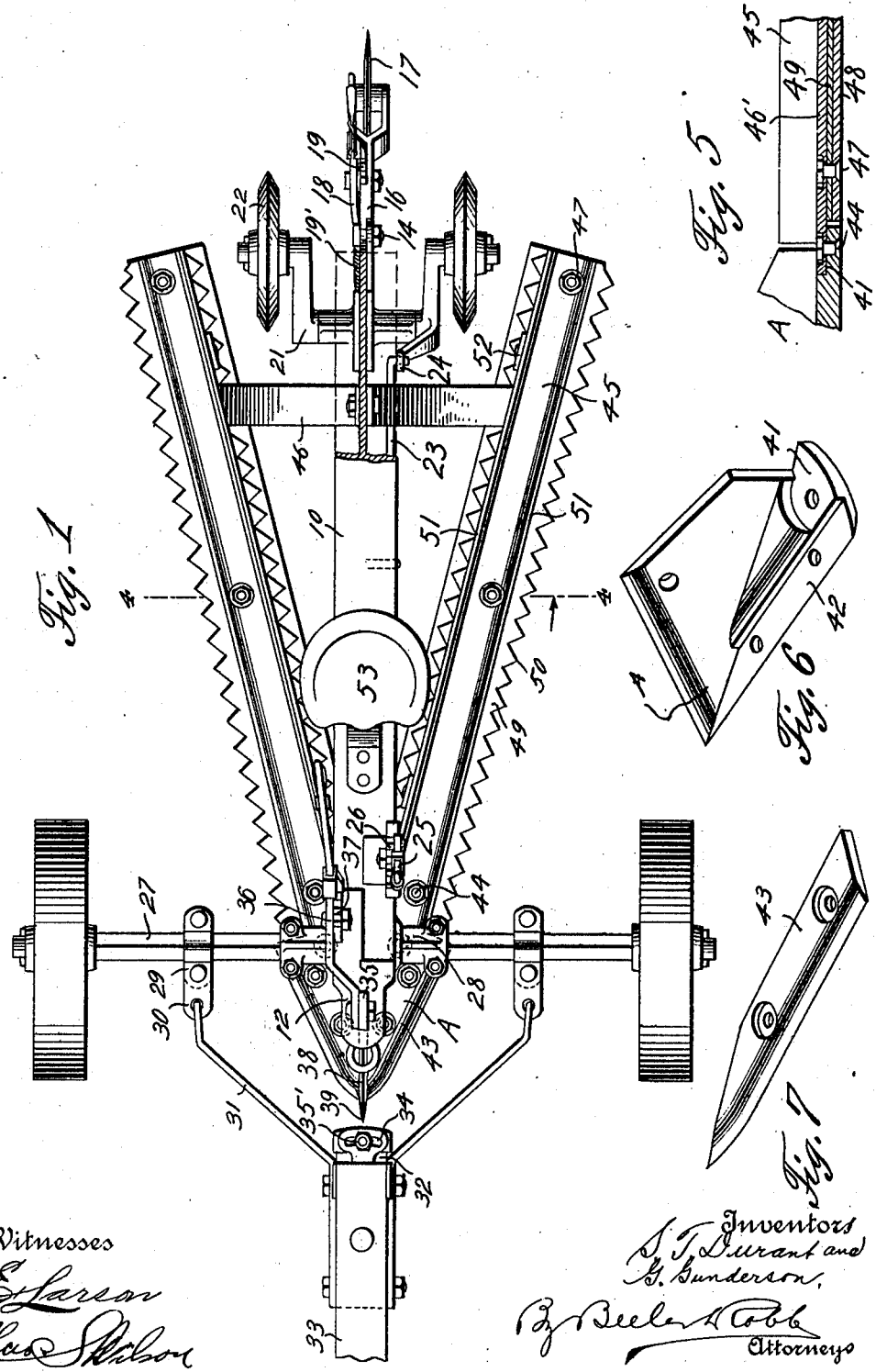

S. T. DURANT & G. GUNDERSON.
W. C. HOWIE, ADMINISTRATOR OF S. T. DURANT, DEC'D.
SAGE BRUSH GRUBBING MACHINE.
APPLICATION FILED NOV. 6, 1909.
978,118.
Patented Dec. 6, 1910.
2 SHEETS—SHEET 2.
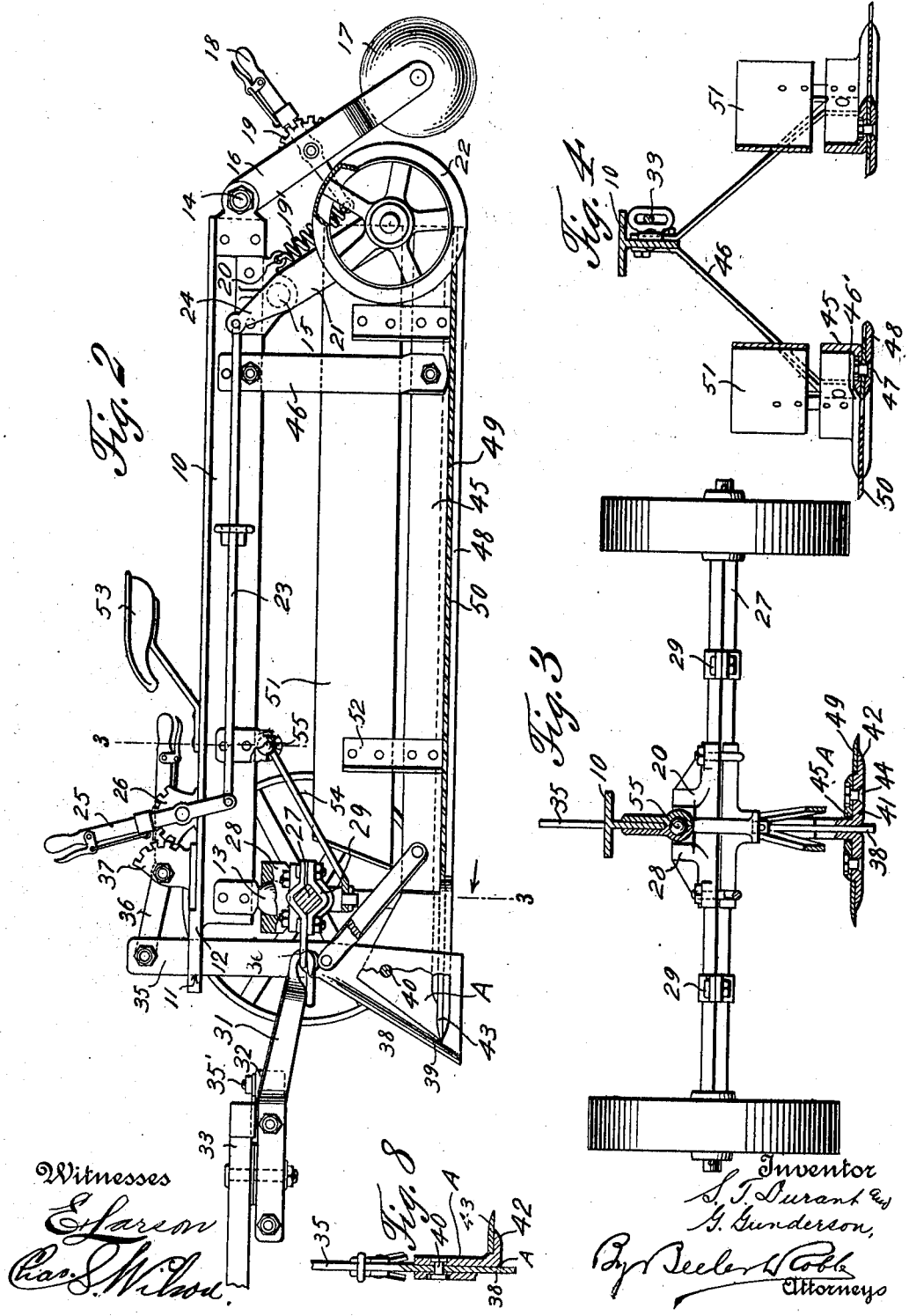

UNITED STATES PATENT OFFICE.

SAMUEL T. DURANT AND GUST GUNDERSON, OF MOUNTAIN HOME, IDAHO; W. C. HOWIE, ADMINISTRATOR OF SAID SAMUEL T. DURANT, DECEASED, ASSIGNOR TO THECLA DURANT.

SAGE-BRUSH-GRUBBING MACHINE.

978,118.   Specification of Letters Patent.   Patented Dec. 6, 1910.

Application filed November 6, 1909. Serial No. 526,610.

*To all whom it may concern:*

Be it known that we, SAMUEL T. DURANT and GUST GUNDERSON, citizens of the United States, residing at Mountain Home, in the county of Elmore and State of Idaho, have invented certain new and useful Improvements in Sage-Brush-Grubbing Machines, of which the following is a specification.

This invention relates to sage brush grubbing machines, and is designed to construct a machine of this character that will adapt itself to all irregularities of the ground and will completely up-root and move to one side the sage.

A further object is to construct a machine which when not in use will be easily transported from one locality to another without in any way endangering the cutting facilities thereof or damaging the machine in any way.

A further object of this invention is to not only remove the vegetable matter from the ground, but to place it to one side in easily gathered windrows.

For a full understanding of the invention, reference is to be had to the following detail description and to the accompanying drawings, in which—

Figure 1 is a plan view of a machine constructed in accordance with the present invention; Fig. 2 is a central longitudinal section of the same; Fig. 3 is a transverse section taken along line 3—3 of Fig. 2, parts thereof being eliminated; Fig. 4 is a similar view taken on the line 4—4 of Fig. 1, parts thereof being eliminated; Fig. 5 is a longitudinal section taken through the pivot of the cutting bar; Fig. 6 is a perspective view of one side of the cutter bar; Fig. 7 is a similar view of the cutter attached to the cutter bar head; Fig. 8 is a vertical section through the cutter head looking toward the rear, parts thereof being eliminated.

The machine forming the subject-matter of this invention comprises a longitudinally extending bar 10, said bar forming the main frame of the machine and having the forward extremity contracted and pierced by the orifice 11. This bar is approximately T-shaped in cross section and has secured on the lower part thereof adjacent the reduced portion 12 the downwardly projecting ball 13 to which is pivoted the forward axle hereinafter more fully described. At the rearward extremity is a pivot 14 and a bearing 15 adjacent thereto for the rear axle.

Pivotally secured to the pivot 14 is the bracket 16 having journaled at its lower extremity the colter 17. In order to provide a means whereby the force with which the colter bears against the ground may be regulated, there is provided midway between the pivot 14 and the colter a lever 18 pivotally secured to the bracket and provided with the quadrant 19. The lower extremity of the lever is secured to a spring 19′, the opposite terminal of which is attached to the eye 20 carried on the bar 10.

A U-shaped axle 21 is journaled in the bearing 15 and carries at the lower extremity of its arms the rear wheels 22. The height of the wheels from the ground is regulated by a link rod connection 23 extending along the frame 10 and connecting a projection 24 on the axle to a lever 25 carried at the forward extremity of the bar or frame 10. This lever is provided with a quadrant 26 and is so located that the wheels 22 may be raised and lowered at will.

The forward axle 27 is provided with the socket 28 clamped thereon in any suitable manner, said socket receiving the ball 13 on the frame 10 and providing a means whereby the forward wheels may take up all the irregularities of the ground and also an axis about which the said axle may swing. The forward axle 27 is also provided with the axle clamps 29, said axle clamps having the eyes 30 formed therein. The hounds 31 are secured in said eyes and carry at their forward extremities the bar 32 to which is pivoted the pole 33, the rear extremity of said pole being supplied with a curved slot 34 in which is received the bolt or pin 35′ which provides a means whereby the motion of the pole may be limited and sudden jar alleviated.

Vertically movable in a slot 11 is the bar 35 to which is secured the lever 36 which operates on the quadrant 37, said lever being so constructed that it is able to adjust the bar to various heights. The lower extremity of this bar is enlarged to form the cutting plate 38, said cutting plate being adapted to loosen the ground in advance of the cutting bars 45.

A cutter head indicated in general as A is pivotally secured to each side of the cutting plate 38 by the pin 40 and is approximately rectangular in cross section. This cutter head being of rectangular cross section has the recess 41 formed therein to provide a means whereby the longitudinal cutting bars may be pivoted to the cutter head, and also has the longitudinally extending recess 42 in which is bolted the cutting blade 43, set forth specifically in Fig. 7. The cutting plate 38 extends below the surface of the cutter head as is shown in Fig. 3 and has the forward edge 39 thereof sharpened. Thus it will be seen that the cutting plate in combination with the cutting heads completely loosens the roots and partially removes the plants from the soil.

Pivotally secured to the cutter head in the recesses 41 by the pins 44 are longitudinally extending angle irons 45, said angle irons diverging and being supported at their rearward extremities by converging braces 46 secured thereto and to the frame 10. The lower flange 46' of these irons is pierced by a series of orifices through which the bolts 47 pass, clamping between said flange and the clamping plate 48 the cutting bars 49, said cutting bars being provided with sawteeth 50 on each longitudinal side thereof.

In order to prevent the plants or brush from being thrown between the cutter bars there are provided the shields 51 superimposed above the cutting bars by the supports 52, said supports being secured to the upright flange of the angle irons.

The entire device is supplied with a suitable seat 53 adjacent the levers 25 and 36 from which the wheels 22 may be raised and the cutting plate 38 lowered at the will of the operator. A brace 54 is also provided for the forward axle 27 and is secured to the beam or frame 10 by the universal joint 55.

In operation the cutter plate 38 loosens the earth or soil around the roots after which the cutting blades 43 come into contact with the plants or brush and force the same to one side, after which the converging cutter bars 49 with the saw teeth 50 formed therein tear the same from the ground and force it to one side in approximately regular windrows from which it is comparatively a simple matter to remove the brush from the field being cleared.

Having thus described the invention, what is claimed as new is:

1. In a machine of the class described, the combination with a supporting frame, of a soil cutting head movable vertically at the forward extremity of said supporting frame, cutting bars converging to said cutter head, a cutting plate carried by said head and extending below the lower surface thereof, and means whereby said cutting apparatus may be raised and lowered from contact with the ground for transportation.

2. In a machine of the class described, the combination with a supporting frame, of a forward axle swiveled to the forward extremity of said frame, a rearward axle pivoted thereto, means for raising and lowering said rearward axle, a cutter plate movable vertically in said frame adjacent the forward axle, cutter heads pivotally secured to each side of said cutter plate, toothed bars pivotally secured to said cutter head and attached at their rearward extremity to said frame, and means for raising and lowering said cutting plate.

3. In a machine of the class described, the combination with a supporting frame, of converging toothed cutter bars secured thereto, means for raising and lowering the forward extremity of said cutter bars, a colter pivotally supported to the rearward extremity of said frame by a bracket, and means for regulating the pressure with which said colter bears against the ground.

4. In a machine of the class described, the combination with a supporting frame, of a forward axle swiveled to said supporting frame having a brace thereto attached to said frame by a universal joint, a rear axle pivoted to said frame, and adapted to be raised and lowered, a colter bracket pivotally mounted adjacent said rearward axle carrying at its lower extremity a colter, means interposed between said colter and pivot for regulating the tension with which the same bears against the ground, and means for cutting and removing the plants.

5. In a machine of the class described, the combination with a longitudinally extending bar having a cutter plate adjustable vertically on the forward extremity thereof, cutter heads removably secured to each side of said cutter plate forming in combination a removable cutter head, and converging cutter bars secured to said removable cutter head carrying toothed cutting blades.

6. In a machine of the class described, the combination with a supporting bar having an axle carrying wheels swiveled to the forward extremity thereof, radially adjustable wheels carried at the rear extremity thereof, of a cutter plate adjustable vertically in the forward extremity of said bar, cutter heads secured to said cutting plate, said cutting plate extending below the surface of said cutter heads, angle bars pivotally connected to said cutter heads, toothed cutting bars removably carried by said angle bars, means whereby said device may be operated in approximately a straight line, and means whereby all growths may be kept from between said cutter bars.

7. In a machine of the class described, the combination with a longitudinally extending T-bar having an axle carrying wheels swiveled at one extremity thereof and radially adjustable wheels at the rear extremity thereof; of a bar adjustable vertically in the forward extremity of said T-bar having an enlargement at its lower extremity forming a cutting plate, cutting heads so attached to said cutting plate that the same project below the lower surface thereof, converging angle irons pivoted to said cutter head, cutter bars detachably carried on each cutter head, toothed cutter bars removably carried by said angle bars, and means whereby all unevenness and irregularities of the ground may be overcome.

8. In a machine of the class described, the combination with a longitudinally extending bar having wheels swiveled at its forward extremity, rear wheels pivotally mounted on said bar at the rear extremity thereof and adapted to be swung into and out of contact with the ground, a cutter plate adjustable vertically in the forward extremity of said bar, cutter heads secured to said plate, converging angle bars pivotally connected to said cutter heads, clamping plates carried by said angle bars, and toothed cutting bars secured between said clamping plates and angle bars.

9. In a machine of the class described, the combination with a supporting bar, a vertically movable cutting plate secured to said supporting bar, cutter heads pivotally secured to each side of said cutter plate, cutter bars carried by said cutter head, and converging toothed cutter bars also pivotally secured to said head.

In testimony whereof we affix our signatures in presence of two witnesses.

SAMUEL T. DURANT.
GUST GUNDERSON.

Witnesses:
ELIZABETH GREENWALD,
E. M. WOLFE.